United States Patent
Fujishima et al.

(10) Patent No.: US 11,300,181 B2
(45) Date of Patent: Apr. 12, 2022

(54) CHAIN POWER TRANSMISSION MECHANISM AND SILENT CHAIN

(71) Applicant: TSUBAKIMOTO CHAIN CO., Osaka (JP)

(72) Inventors: Kosuke Fujishima, Osaka (JP); Toshifumi Sato, Osaka (JP); Takeo Sasaki, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 509 days.

(21) Appl. No.: 16/285,826

(22) Filed: Feb. 26, 2019

(65) Prior Publication Data

US 2019/0309825 A1 Oct. 10, 2019

(30) Foreign Application Priority Data

Apr. 9, 2018 (JP) .............................. JP2018-074512

(51) Int. Cl.
*F16G 13/04* (2006.01)
*F16H 55/30* (2006.01)

(52) U.S. Cl.
CPC .............. *F16G 13/04* (2013.01); *F16H 55/30* (2013.01)

(58) Field of Classification Search
CPC .......... F16G 13/02; F16G 13/04; F16G 15/12; F16H 55/02; F16H 55/30; F16H 7/06; F16H 57/028
See application file for complete search history.

(56) References Cited

U.S. PATENT DOCUMENTS

| | | | | |
|---|---|---|---|---|
| 6,663,522 B2* | 12/2003 | Horie | ...................... | F16G 13/04 |
| | | | | 474/212 |
| 7,901,312 B2* | 3/2011 | Ogo | ........................ | F16H 55/08 |
| | | | | 474/212 |
| 10,400,869 B2* | 9/2019 | Sato | ........................ | F16G 13/04 |
| 2002/0119853 A1 | 8/2002 | Horie | | |
| 2005/0277507 A1* | 12/2005 | Ogo | ........................ | F16G 13/04 |
| | | | | 474/206 |

(Continued)

FOREIGN PATENT DOCUMENTS

| | | |
|---|---|---|
| EP | 1036953 A1 | 9/2000 |
| JP | 2000-266131 A | 9/2000 |

(Continued)

*Primary Examiner* — Michael R Mansen
*Assistant Examiner* — Juan J Campos, Jr.
(74) *Attorney, Agent, or Firm* — WHDA, LLP

(57) ABSTRACT

Provided is a chain power transmission mechanism and a silent chain each having a simple configuration, easy to manufacture, and capable of reducing noise in the entire chain power transmission mechanism. Link plates of the silent chain include an inner-flank-engagement link plate which engages with a sprocket in an inner flank engagement mode and an outer-flank-engagement link plate which engages with the sprocket in an outer flank engagement mode. The inner-flank-engagement link plate and the outer-flank-engagement link plate are arranged such that combinations of the link plates at positions where engagement with and disengagement from a plurality of the sprockets are synchronized include a combination in which at least one of the link plates is different in engagement mode from another link plate.

2 Claims, 4 Drawing Sheets

(56) References Cited

U.S. PATENT DOCUMENTS

| | | | |
|---|---|---|---|
| 2007/0111835 A1* | 5/2007 | Ogo | F16G 13/04 474/213 |
| 2009/0131209 A1 | 5/2009 | Morimoto et al. | |
| 2018/0066731 A1* | 3/2018 | Sato | F16H 7/06 |

FOREIGN PATENT DOCUMENTS

| | | |
|---|---|---|
| JP | 2002-250406 A | 9/2002 |
| JP | 2008-138789 A | 6/2008 |
| JP | 2009-127648 A | 6/2009 |

* cited by examiner

CHAIN POWER TRANSMISSION MECHANISM AND SILENT CHAIN

BACKGROUND OF THE INVENTION

1. Field of the Invention

The present invention relates to a chain power transmission mechanism including a plurality of sprockets and a silent chain wound around the sprockets and to the silent chain.

2. Description of the Related Art

A chain power transmission mechanism using a silent chain wound around a plurality of sprockets is well known and used widely for such purposes as transmitting a drive force, synchronizing rotation timings, and changing the number of rotations or a torque.

In general, a silent chain is configured by bendably coupling together a large number of link plates each having a pair of tooth portions and a pair of pin holes using coupling pins inserted in the individual pin holes. A chain power transmission mechanism is configured such that the silent chain is endlessly wound around a plurality of sprockets and the tooth portions of the link plates engage with the teeth of the sprockets to transmit rotation.

In such a chain power transmission mechanism, when each of link plates of a silent chain is threaded into a sprocket from a free span, first, an operation occurs in which the tooth portions of the link plate come into contact with the teeth of the sprocket to engage therewith and then the silent chain is wound around the sprocket to be bent and seat thereon. During rotation, each of the link plates performs this operation so that the operation is periodically repeated at a high speed. Accordingly, it is required to reduce noise generated during the engagement and the seating.

For example, in each of the known chain power transmission mechanisms disclosed in Japanese Patent Application Publication No. 2000-266131, Japanese Patent Application Publication No. 2002-250406, and the like, link plates having pairs of teeth at different pitches are irregularly mixed and provided in a silent chain to irregularize engagement/seating timings and reduce noise.

In the known chain power transmission mechanism disclosed in Japanese Patent Application Publication No. 2008-138789, link plates having different spring constants when engagement with sprocket teeth begins are irregularly mixed and provided in a silent chain to irregularize impact on the engagement and reduce noise.

In the known chain power transmission mechanism disclosed in Japanese Patent Application Publication No. 2009-127648 or the like, each of couplings pins in a silent chain is configured as a combination type including rocker pins and joint pins. By irregularly mixing the rocker pins and the joint pins which are different in thickness, the engagement/seating timings are irregularized to reduce noise.

SUMMARY OF THE INVENTION

In such a known chain power transmission mechanism, noise generated during engagement/seating with/on sprockets can be reduced. However, when a silent chain is wound around the plurality of sprockets, noise in the same pattern is generated in each of the sprockets. Consequently, even though the noise can be reduced in each of the sprockets, the peak of a primary sound is not reduced in the entire chain power transmission mechanism, and it may be impossible to reduce noise which presents a problem when the chain power transmission mechanism is actually used.

In addition, depending on the length or the number of rotations of the chain, a tension change resulting from the irregularized engagement/seating timings may unintentionally increase noise and vibration. Particularly in a chain power transmission mechanism which transmits a large torque, the durability and lifetime thereof may be adversely affected.

The present invention is achieved to solve such problems and an object thereof is to provide a chain power transmission mechanism and a silent chain each having a simple configuration, easy to manufacture, and capable of reducing the peak of a primary sound in the entire chain power transmission mechanism and reducing noise which presents a problem when the chain power transmission mechanism is actually used.

A chain power transmission mechanism according to the present invention includes a plurality of sprockets and a silent chain wound around the plurality of sprockets. Link plates of the silent chain include an inner-flank-engagement link plate which engages with the sprocket in an inner flank engagement mode and an outer-flank-engagement link plate which engages with the sprocket in an outer flank engagement mode. The inner-flank-engagement link plate and the outer-flank-engagement link plate of the silent chain are arranged such that combinations of the link plates at positions where engagement with and disengagement from the plurality of sprockets are synchronized include a combination in which at least one of the link plates is different in engagement mode from another link plate. Thus, the chain power transmission mechanism according to the present invention solves the problems described above.

In the chain power transmission mechanism according to a first aspect of the present invention and the silent chain according to a fourth aspect of the present invention, the inner-flank-engagement link plate and the outer-flank-engagement link plate are arranged such that the combinations of the link plates at the positions where the engagement with and the disengagement from the plurality of sprockets are synchronized include the combination in which at least one of the link plates is different in engagement mode from another link plate. This can vary the timing of the engagement of the silent chain with the plurality of sprockets, reduce the peak of a primary sound in the entire chain power transmission mechanism, and reduce noise which presents a problem when the chain power transmission mechanism is actually used.

In addition, mere provision of the two types of link plates can vary the mode of engagement between the plurality of sprockets and the silent chain. Accordingly, it is possible to reduce manufacturing labor and cost.

In the configurations in accordance with second and fifth aspects of the present invention, the inner-flank-engagement link plate and the outer-flank-engagement link plate are arranged such that combinations of the link plates at positions at both ends of a tension side where the engagement and the disengagement are synchronized include a combination in which the link plates are different in engagement mode. This suppresses the occurrence of vibration in a tension-side free span of the silent chain where resonance easily occurs and can further reduce noise.

In the configurations in accordance with third and sixth aspects of the present invention, all the link plates are seated on the sprockets in either an outer-flank-seating mode or an inner-flank-seating mode. This eliminates a tension change resulting from irregularized seating, inhibits the occurrence of noise or vibration, and can prevent reductions in durability and lifetime.

DESCRIPTION OF THE PREFERRED EMBODIMENTS

A chain power transmission mechanism of the present invention is a chain power transmission mechanism including a plurality of sprockets and a silent chain wound around the plurality of sprockets. Link plates of the silent chain include an inner-flank-engagement link plate which engages with the sprocket in an inner flank engagement mode and an outer-flank-engagement link plate which engages with the sprocket in an outer flank engagement mode. The inner-flank-engagement link plate and the outer-flank-engagement link plate of the silent chain are arranged such that combinations of the link plates at positions where engagement with and disengagement from the plurality of sprockets are synchronized include a combination in which at least one of the link plates is different in engagement mode from another link plate. A silent chain of the present invention is a silent chain wound around sprockets. The silent chain includes link plates including an inner-flank-engagement link plate which engages with the sprocket in an inner flank engagement mode and an outer-flank-engagement link plate which engages with the sprocket in an outer flank engagement mode. The inner-flank-engagement link plate and the outer-flank-engagement link plate are arranged such that combinations of the link plates at positions where engagement with and disengagement from the plurality of sprockets are synchronized include a combination in which at least one of the link plates is different in engagement mode from another link plate. As long as each of the chain power transmission mechanism and the silent chain has a simple configuration, is easy to manufacture, and is capable of reducing the peak of a primary sound in the entire chain power transmission mechanism and reducing noise which presents a problem when the chain power transmission mechanism is actually used, each of the chain power transmission mechanism and the silent chain may have any specific configuration.

Figure 1A:
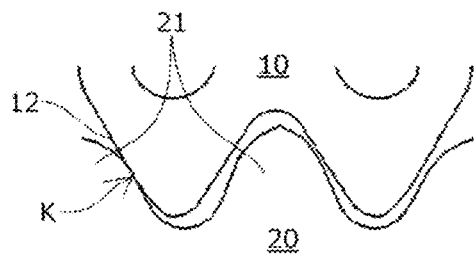
FIGS. 1A and 1B are illustrative views of a mode of engagement of a silent chain with sprockets.
Figure 1B:
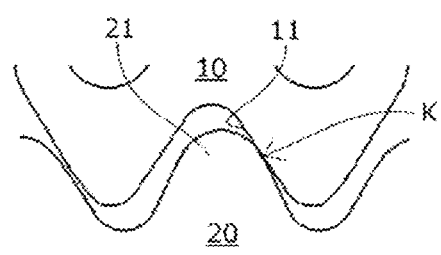

In a chain power transmission mechanism having a silent chain, when the silent chain is threaded into a sprocket to engage therewith, the engagement includes two modes, i.e., an outer flank engagement mode and an inner flank engagement mode. In the outer flank engagement mode, as shown in FIG. 1A, an outer flank 12 of a link plate 10 comes into first contact with one of teeth 21 of a sprocket 20 at an engagement point K (which is the last remaining in contact with the link plate 10 on disengagement). In the inner flank engagement mode, as shown in FIG. 1B, an inner flank 11 of the link plate 10 comes into first contact with one of the teeth 21 of the sprocket 20 at the engagement point K (which is the last remaining in contact with the link plate 10 on disengagement).

Figure 2A:
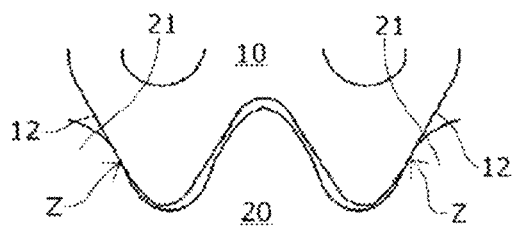
FIGS. 2A and 2B are illustrative views of a mode of seating of the silent chain on the sprockets.
Figure 2B:
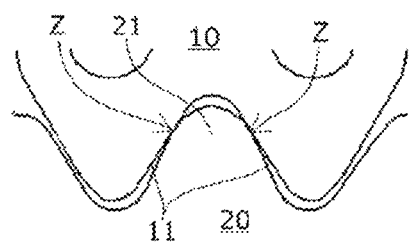

When the silent chain is then wound around the sprocket to be seated thereon, the seating includes two modes, i.e., an outer flank seating mode and an inner flank seating mode. In the outer flank seating mode, as shown in FIG. 2A, the outer flank 12 of the link plate 10 is seated on one of the teeth 21 of the sprocket 20 at a seating point Z. In the inner flank seating mode, as shown in FIG. 2B, the inner flank 11 of the link plate 10 is seated on the teeth 21 of the sprocket 20 at the seating point Z.

That is, when the silent chain is wound around the sprocket, there are the four engagement/seating modes, i.e., an inner flank engagement/inner flank seating mode, an inner flank engagement/outer flank seating mode, an outer flank engagement/inner flank seating mode, and an outer flank engagement/outer flank seating mode.

In the chain power transmission mechanism and the silent chain of the present invention, inner-flank-engagement link plates and outer-flank-engagement link plates are arranged such that combinations of the link plates at positions where engagement with and disengagement from a plurality of the sprockets are synchronized includes a combination in which at least one of the link plates is different in engagement mode from another link plate. This reduces the peak of a primary sound in the entire chain power transmission mechanism and reduces noise which presents a problem when the chain power transmission mechanism is actually used.

Figure 3:
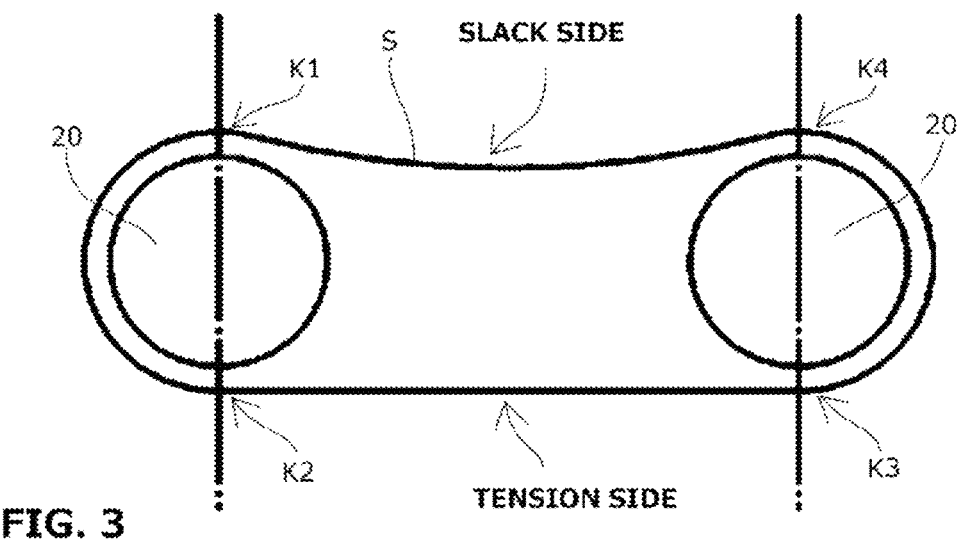
FIG. 3 is an illustrative view of a side surface of an embodiment of the present invention.

As schematically shown in FIG. 3, when a silent chain S is wound around the two sprockets 20, engagement with and disengagement from the sprockets 20 are synchronized at four engagement positions K1, K2, K3, and K4.

The lower free span between the two sprockets 20 corresponds to a tension side on which a tension is placed, while the upper free span between the two sprockets 20 corresponds to a slack side on which substantially no tension is placed (the slack on the slack side is exaggeratingly illustrated).

Figure 4:
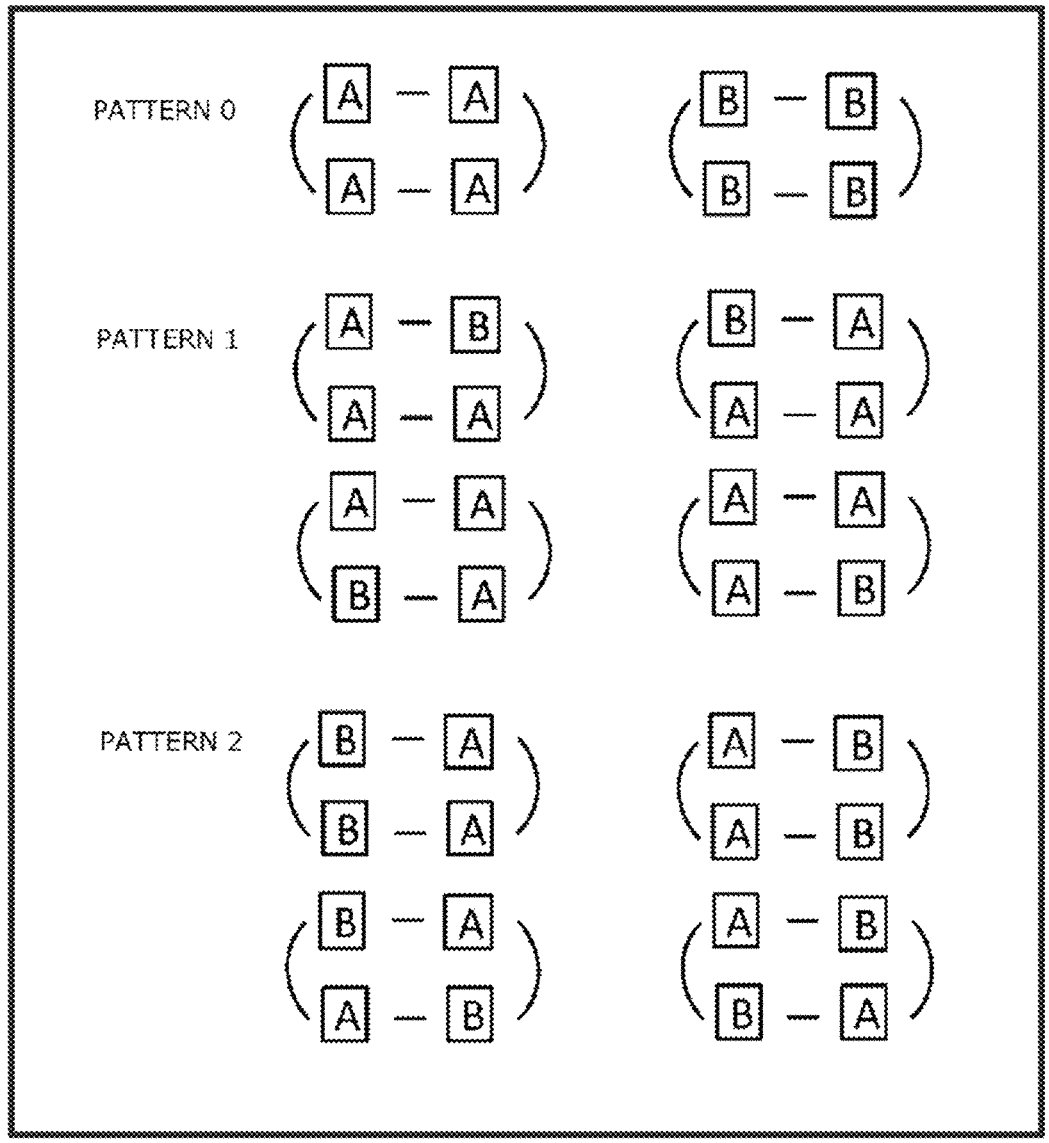
FIG. 4 is an illustrative view showing combinations of link plates at positions where engagement with and disengagement from the sprockets are synchronized.

When the link plates of the silent chain which engage with the sprockets in the two engagement modes, i.e., the inner and outer flank engagement modes (A and B) are mixed and used, those of the arranged link plates which engage with the sprockets 20 in synchronization at the four engagement positions K1, K2, K3, and K4 during rotation are included in any of combinations in patterns 0, 1, and 2 (the pattern 1 includes a pattern in which A and B are switched to each other, but the illustration thereof is omitted), as shown in FIG. 4.

In the present invention, the inner-flank-engagement link plates and the outer-flank-engagement link plates are arranged such that combinations of the link plates which appear at the engagement positions K1, K2, K3, and K4 during rotation include any of the combinations in the patterns 1 and 2 and do not include only the combinations in the pattern 0. This reduces the peak of a primary sound in the entire chain power transmission mechanism and reduces noise which presents a problem when the chain power transmission mechanism is actually used.

In addition, by arranging the inner-flank-engagement link plates and the outer-flank-engagement link plates such that combinations of the link plates which appear at the engagement positions K1, K2, K3, and K4 during rotation include any of the combinations in the pattern 2 and do not include only the combinations in the patterns 0 and 1, the occurrence of vibration in the tension-side free span where resonance easily occurs is inhibited and noise can further be reduced.

Figure 5:
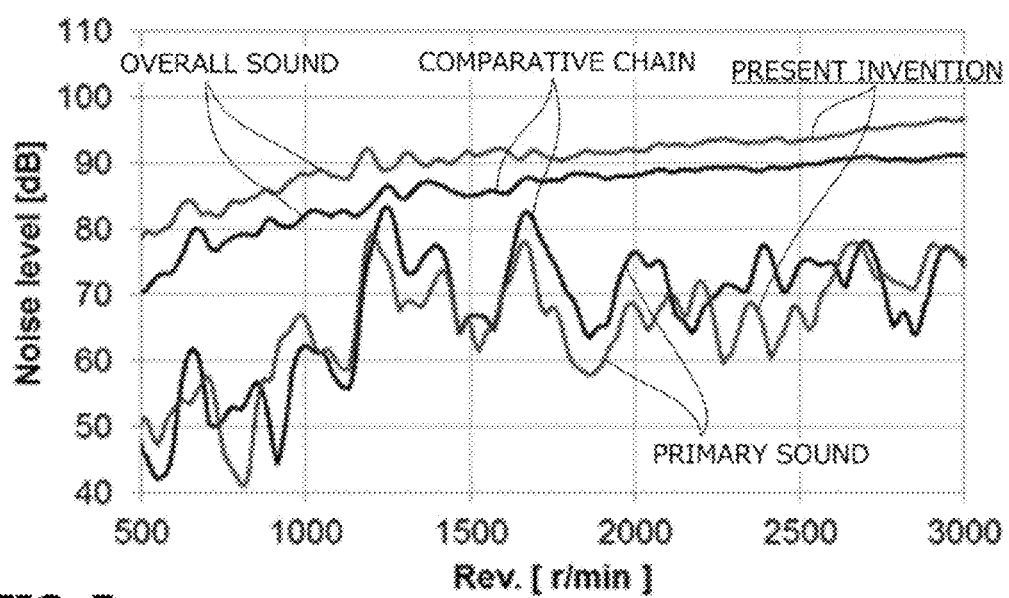
FIG. 5 is a graph of a noise level in the embodiment of the present invention.

FIG. 5 shows the result of measuring noise in the chain power transmission mechanism of the present invention.

In the drawing, "COMPARATIVE CHAIN" shows the result when a silent chain including only the plates engaging in the inner flank engagement mode was used and the axial torque of each of the sprockets was set to 150 Nm.

In the chain power transmission mechanism of the present invention, the peak of the primary sound is reduced, the primary sound is drowned out by an overall sound, and noise which presents a problem when the chain power transmission mechanism is actually used can be reduced.

Note that, as long as the inner-flank-engagement link plates and the outer-flank-engagement link plates are arranged such that combinations of the link plates at the positions where the engagement with and the disengagement from the plurality of sprockets are synchronized include a combination in which at least one of the link plates is different in engagement mode from another link plate, the number of the link plates engaging in one of the two engagement modes and the number of the link plates engaging in the other of the two engagement modes may be at any ratio.

It may be possible that the link plates include inner-flank-engagement link plates and outer-flank-engagement link plates which are different in engagement height, and three or more types of link plates are included in the silent chain. It may also be possible that the link plates include those different in seating mode, and a larger number of types of link plates are included in the silent chain The chain power transmission mechanism may also be such that the silent chain is wound around three or more sprockets or sprockets having different numbers of teeth are included in the chain power transmission mechanism.

A primary sound and a resonance frequency which contribute to suppression of noise and vibration differ depending on the actual use environment of the chain power transmission mechanism. However, by appropriately designing the link plates in terms of the types and arrangement thereof and adjusting the frequencies at which the patterns 0, 1, and 2 appear as well as the order of appearance of the patterns 0, 1, and 2, the chain power transmission mechanism can be optimized.

What is claimed is:

1. A chain power transmission mechanism, comprising:
two sprockets; and
a silent chain wound around the two sprockets, wherein link plates of the silent chain include an inner-flank-engagement link plate which engages with the two sprockets in an inner flank engagement mode and an outer-flank-engagement link plate which engages with the two sprockets in an outer flank engagement mode, and
the inner-flank-engagement link plate and the outer-flank-engagement link plate of the silent chain are arranged such that combinations of the link plates at positions at both ends of a tension side where engagement and disengagement are synchronized include a combination in which the link plates are different in engagement mode, and at both ends of a slack side where the engagement and the disengagement are synchronized include a combination in which the link plates are different in engagement mode.

2. The chain power transmission mechanism according to claim 1, wherein all the link plates of the silent chain are seated on the two sprockets in either an outer-flank-seating mode or an inner-flank-seating mode.

\* \* \* \* \*